US011726982B1

United States Patent
Azam et al.

(10) Patent No.: US 11,726,982 B1
(45) Date of Patent: Aug. 15, 2023

(54) CONTINUOUS EXECUTION ENGINE ALGORITHM

(71) Applicant: Amazon Technologies, Inc., Seattle, WA (US)

(72) Inventors: Mohammed Talal Yassar Azam, Snoqualmie, WA (US); Ahmed Gamal Hamed, Mill Creek, WA (US); Mohammad Adnan, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 17/491,302

(22) Filed: Sep. 30, 2021

(51) Int. Cl.
*G06F 16/23* (2019.01)

(52) U.S. Cl.
CPC .............................. *G06F 16/2365* (2019.01)

(58) Field of Classification Search
None
See application file for complete search history.

(56) References Cited

U.S. PATENT DOCUMENTS

| 10,581,886 | B1 * | 3/2020 | Sharifi Mehr | H04L 63/1441 |
| 2008/0301175 | A1 * | 12/2008 | Applebaum | G06F 16/24565 |
| | | | | 707/999.102 |
| 2019/0073253 | A1 * | 3/2019 | Sharifi Mehr | H04L 63/1433 |
| 2021/0117416 | A1 * | 4/2021 | Sriharsha | G06F 16/9032 |

* cited by examiner

Primary Examiner — Irene Baker
(74) Attorney, Agent, or Firm — Davis Wright Tremaine LLP

(57) ABSTRACT

Systems and methods are described for using a recurring event based scheduler to continuously monitor data to detect anomalies within the data. In some aspects, an anomaly detection schedule may be determined for monitoring time series data to detect anomalies based on a data ingestion interval. A plurality of anomaly detection events may be sequentially generated and stored in an event queue at times specified by the anomaly detection schedule. The anomaly detection events may then be processed sequentially from the event queue to trigger execution of a plurality of anomaly detection workflow tasks at the times specified by the anomaly detection schedule. In some cases, execution of individual anomaly detection workflow tasks causes individual portions of time series data to be obtained from a customer data source and processed by an anomaly detection model to detect anomalies in the time series data.

22 Claims, 8 Drawing Sheets

CONTINUOUS EXECUTION ENGINE ALGORITHM

BACKGROUND

Anomaly detection is becoming increasingly more important to analyze large amounts of data, such as are generated by cloud computing systems, customer applications, and so on. Existing anomaly detection systems typically use time-based patterns to identify anomalies across a number of metrics, such as revenue, click rate, and others. These systems may analyze time-series data, or data that includes information or measurements collected over a period of time, and generate notifications if anomalies are detected within that data, after the data is analyzed. Analyzing and detecting anomalies within time series data in real time or near real time, such as on a continuous basis, however, presents of number of challenges. These challenges include ensuring that the data ingested is analyzed sequentially to detect time-based anomalies, ensuring that the data is processed quickly enough to provide notifications that are relevant, and ingesting the data from different sources. Accordingly, techniques are needed for detecting anomalies in real time or near real time.

BRIEF DESCRIPTION OF THE DRAWINGS

Various techniques will be described with reference to the drawings, in which.

DETAILED DESCRIPTION

Figure 1:
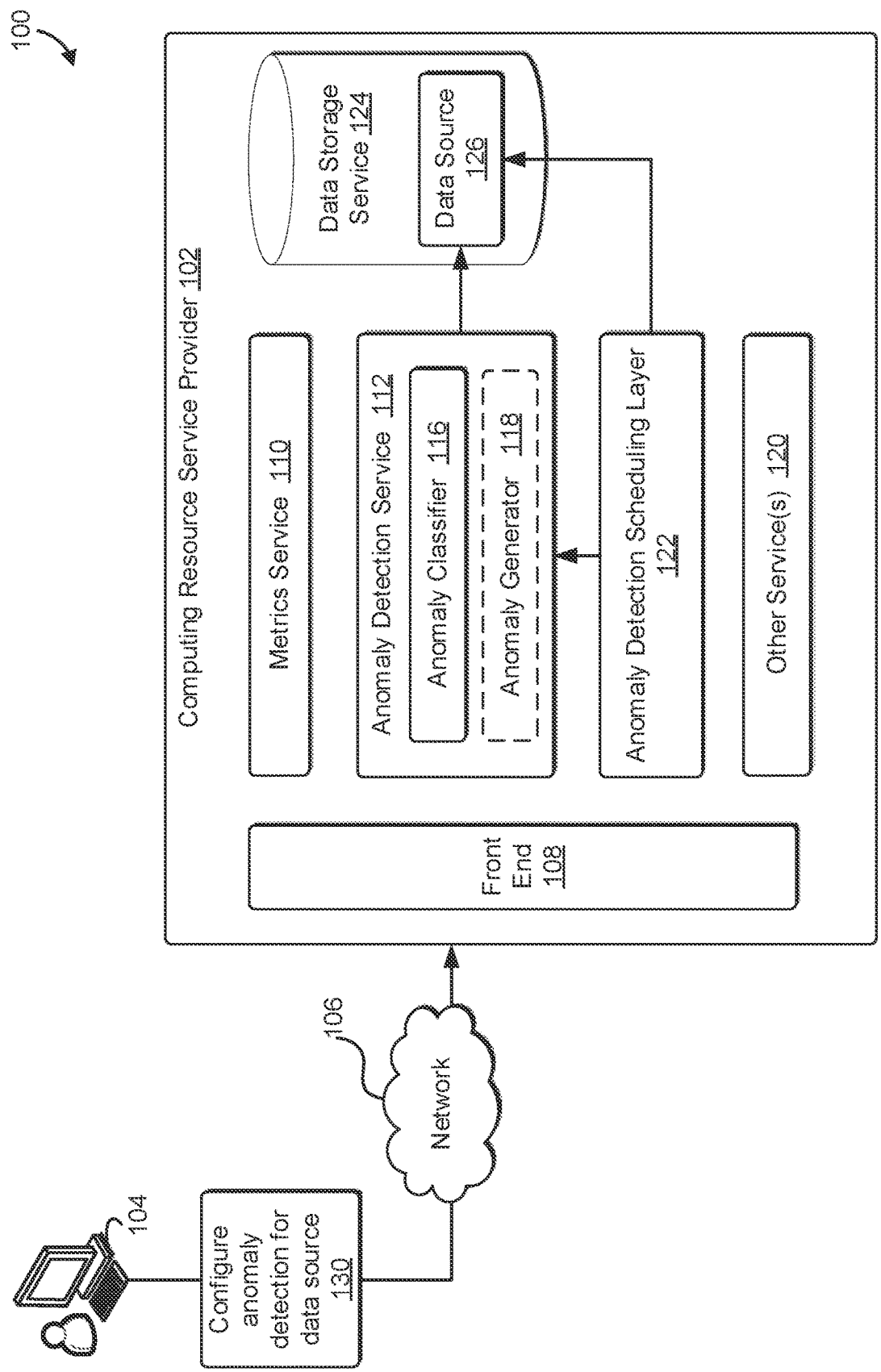
FIG. 1 illustrates an example environment in which the described techniques can be practiced, according to at least one embodiment.

Various systems and methods are described herein directed to detecting anomalies in various forms of data in real time or near real time using an event based scheduler. In some aspects, a recurring event-based scheduler may be created and employed to support continuous or real time/near real time anomaly detection in customer data that is ingested continuously or at regular intervals. A customer may specify a data ingestion interval or granularity with which they want anomalies detected in their data, and a source of the data itself. The data ingestion interval may be 1 minute, 5 minutes, 1 hour, 12 hours, 1 day, or other time period. The customer data may be ingested and aggregated, such that data that is associated with each interval of time is aggregated into a single portion of data associated with a single point in time. An anomaly detection scheduling layer may then generate a schedule for triggering execution of anomaly detection tasks for these portions of the customer data based on the data ingestion interval. In this way, customer data may be continuously ingested and analyzed by one or more anomaly detection models, at a specified data ingestion interval, to provide real time or near real time monitoring and detection of anomalies within the data. In some cases, the schedule may be modified to account for delays in ingesting the data, such as by adding a delay between the start of a data ingestion interval and a time at which the customer data is processed to detect anomalies. In other cases, additional techniques may be employed to introduce jitter in the customer data, such as by introducing another delay between the start of a data ingestion interval and a time at which the customer data is processed to detect anomalies, to distribute processing of customer data.

In some aspects, the anomaly detection scheduling layer may include a scheduler/producer, an event queue, and a worker/consumer process. The scheduler may generate an event for each portion of data corresponding to each time window for each data ingestion interval. For example, given a 5 minute data ingestion interval, a schedule may be determined that starts on the hour, say 12:00 am, and triggers execution of an anomaly detection task at 12:05, 12:10, 12:15, etc. The scheduler may generate an anomaly detection event according to this schedule: such as generating one event at 12:00, another at 12:05, and another at 12:10, etc. Each event, upon creation, may be temporarily stored in an event queue. A worker/consumer or other process may detect that the event has been placed in the temporary queue, and process the event. The event itself may reference a specific anomaly detection process or model to be used for analyzing the data in the given time interval, an account the event is associated with, the source of the data to be analyzed, and/or other parameters. The output of the processing may cause the worker/consumer to trigger execution of an anomaly detection task, such as by an anomaly detection service.

In some cases, an anomaly detection service, upon receiving a message from the scheduling layer (e.g., trigger), may obtain customer data from a specified customer data store, corresponding to the time window (e.g., the prior 5 minutes of data in the above example), and use any of a variety of machine learning or rule-based techniques to determine if data contained in the window of data includes data, values, etc., that do not correlate to expected behavior in the data, and take some action in response to detecting an anomaly. The scheduling layer may, subsequently generate and process each anomaly detection event at the corresponding time to cause the anomaly detection service to obtain customer data and monitor it for anomalies, for each time interval. Each event may be processed sequentially to ensure that the data is analyzed in time order, to ensure accurate anomaly detection. In this way, a continuous monitoring scheme may be developed using a recurring event based scheduler to adapt a system may primarily be used for batch anomaly detection.

In some cases, historical or other information may be used to estimate the time it will take the anomaly detection service to analyze a given amount of data, such as may correspond to a different interval size. In some cases, a limit may be imposed on how long processing of data for a given time interval can take, such as based on the interval size itself. In some cases, this limit may be twice the size of the interval itself. In some cases this limit may be used to further place restraints on how much delay can be introduced between the start of an interval or time window and actually processing the data in that time window to detect anomalies. In some cases, each of the different components of the scheduling layer may be provided by a service, such that each component can scale to accommodate a large number of different anomaly detection schedules, such as may be used by multiple customers across multiple data sources. In cases where data jittering techniques are employed, different delays for different schedules may be introduced to better ensure that the processing limit is satisfied across the different schedules.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: 1) more robust and efficient anomaly detection across a wide range of input data, thus enabling computerized system to operate more efficiently, 2) real time or near real time detection of anomalies, thus also enabling computerized system to operate more efficiently, and other benefits and advantages that are described throughout this disclosure.

FIG. 1 illustrates an example environment 100 in which an anomaly detection layer 122 and an anomaly detection service 112 may be provided by a computing resource service provider 102. A client 104 may interact with the computing resource service provider 102 via a front end 108 of computing resource service provider 102 over one or more networks 106 to interact with various data and services, such as through one or more of a anomaly detection layer 122, a metrics service 110, an anomaly detection service 112, a data storage service 124, and/or other services 120, as will be described in greater detail below.

Client 104 may refer to a client computer system or computing device connected to a server (e.g., computing resource service provider) over a network 106. In some cases, client 104 refers to a user or operator of a client computer system, and may be an employee of an organization that utilizes a computing resource service provider 102 to interact with various forms of data, such as through one or more of customer data or customer data source 126, an anomaly detection layer 122, a metrics service 110, an anomaly detection service 112, a data storage service 124, and/or other services 120.

Client 104 may submit a request 130 for access to various computing resources (e.g., services or computing resources thereof) of computing resource service provider 102. The request 130, in some examples, is a web service application programming interface request (also referred to simply as a web service request), may be received by a service of the computing resource service provider 102. As illustrated, the client 104 may submit a request 130 to configure and interact with anomaly detection for customer data, such as may originate from a customer specified or defined data source 126. The request 130 may be directed to one or more services provided by the computing resource service provider 102, and may include a request to access data and anomaly data relating thereto via anomaly detection layer 122, a metrics service 110, an anomaly detection service 112, a data storage service 124, and/or other services 120. In some cases, the request 130 may include anomaly data for configuring the anomaly detection service 112 to detect certain types or characteristics of anomalies, and/or identification of certain data to monitored for the detection of anomalies, such as data from customer data source 126.

In some examples, request 130 may include one or more of: an indication of a source of data to evaluate, a location of where to put detected anomalies, one or more metrics across which to detect anomalies, a data ingestion interval (e.g., a time window size) or granularity at which to detect anomalies/ingest the data, and/or a delay time that indicates a delay between ingesting the data and running it through an anomaly detection model. In some cases, the request may additionally or alternatively include an indication of what users are allowed to provide feedback, an initial configuration (such as sensitivity, indication of what is or is not of interest as anomalies, thresholds, etc.), what type of anomaly to detect, when to present an anomaly, an indication of who is to receive anomalies or indications of their existence, a namespace that includes the metric, a period for evaluation, a statistic or percentile to use, data points to alarm and/or provide an anomaly indication, an indication of treatment of missing data (treat as acceptable, ignore, treat as unacceptable, etc.), etc.

In some cases, the front end 108 may receive the request and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and to process them according to one or more policies associated with the service. In at least one embodiment, client 104 uses client software that is configured to establish a client-server relationship with a service of a computing resource service provider 102. A client 104 may connect to a service via front end 108, which receives requests from clients and routes them to backend services. Front end 108 may interface with one or more of an anomaly detection scheduling layer 122, a metrics service 110, an anomaly detection service 112, a data storage service 124, and/or other services 120 offered by a computing resource service provider 102 to its customers. In at least one embodiment, client 104 interacts with a GUI to interact with various media provided by or through the computing resource service provider 102, and client-side software translates the GUI setup to a web service API request which is transmitted from the client computer system 104 to front end 108 via a network 106.

In some cases, the network 106 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 106 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider described herein may be implemented using techniques described below in reference to FIG. 8. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide one or more of an anomaly detection scheduling layer 122, a metrics service 110, an anomaly detection service 112, a data storage service 124, and/or other services 122. Each of these services may provide ways for a customer to interact with various forms of data, including using the one or more services to detect anomalies in the data.

The anomaly detection scheduling layer 122 may be a collection of computing resources or processes configured to generate and process one or a multitude of different schedules for processing customer data to monitor for and detect anomalies within the customer data, such as from one or more data sources 126. In some aspects, the anomaly detection scheduling layer 122 may be part of or a process executed by the anomaly detection service 112. In other aspects, the anomaly detection scheduling layer 122 may be an independent resource or process, or may utilize other resources or, processes, functions, etc., provided by the computing resource service provider 102.

The anomaly detection scheduling layer 122 may obtain parameters of an anomaly detection job, such that specify a data source, and various parameters of the desired anomaly detection, such as from the request 130 through front end 108 and/or anomaly detection service 112. As used herein, an anomaly detection job may refer to a source of data and/or one or more models, metrics, values, and/or dimensions of data for which anomalies are to be detected across. The job may specify what constitutes an anomaly, such as ranges of metrics, dimensions, or values that are outside of desired values. In other cases what constitutes an anomaly may be determined by an anomaly detector or model. In some examples, the anomaly detection scheduling layer 122 may receive a data ingestion interval or time window length that specifies at what frequency customer data should be analyzed to determine if anomalies exist in the customer data. In some cases, the anomaly detection scheduling layer 122 may also receive a service level agreement parameter or other parameter that specifies when anomaly detection results should be received after the underlying data to be analyzed has been received and/or processed. In yet some cases, the anomaly detection scheduling layer 122 may also receive one or more other time parameters for the anomaly detection, such as a delay period to be implemented between obtaining the data and processing it to detect anomalies.

The anomaly detection scheduling layer 122 may utilize this information to generate a schedule for triggering anomaly detection tasks to be executed by the anomaly detection service 112 based on the received parameters. Using this schedule, the anomaly detection scheduling layer 122 may generate anomaly detection events that in turn trigger the anomaly detection service 112 to obtain the specified window of customer data and run it through one or more models to determine if anomalies are present in that window of data. The anomaly detection service 112 may subsequent store the results of the analyses, such as via the data storage service 124, and or generate one or more notifications to be sent to the client device 104. In this way, the anomaly detection scheduling layer 122 may be utilized to implement continuous real time or near real time monitoring of customer data. A more detailed example of the anomaly detection scheduling layer 122 will be described in greater detail below in reference to FIGS. 2-4.

As illustrated, the metrics service 110 may be a collection of computing resources configured to analyze data, such as from one or more data sources 126, and/or obtain, organize, and or generate various metrics pertaining to that data. The metrics service 110 may access a data source, such as data sources 126, from a data storage service 124 provided by the computing resource service provider 102, and/or via other data sources maintained, stored, or accessed external to the computing resource service provider 102. The metrics service 112 may perform one or more of the following functions: collecting and storing logs, collecting metrics, including of non-time series data and time series data, aggregating metrics, generating alarms, etc., on the data. The metrics service 110 may generate metrics pertaining to a data source 126, which may be used by an anomaly detection service 112 to detect anomalies within a data source 126. In some embodiments, the anomaly detection service 112 may in whole or in part be part of a metrics service 110. In other cases, the metrics service 110 and the anomaly detection service 112 may be separate. In some cases, the metrics service 110 may modify a data source in one or more ways, such as extracting only metrics of the data source that are relevant or specified (e.g., via request 130) for anomaly detection. In some cases, the metrics service 110 may then route the modified data source to the anomaly detection service 112. The metrics service 110 may generate or modify data to generate metrics data, which may be in time series format or non-time series format.

The anomaly detection service 112 may be a collection of computing resources configured to analyze data, such as obtained and/or monitored from a data source 126 (e.g., which may include metric data that was generated or modified by the metrics service 110), on behalf of a customer 104 to detect anomalies within that data. In some cases, the anomaly detection service 102 may obtain customer data directly from a source, either stored by a data storage service 124 as a data source 126, or accessed from outside of the computing resource service provider 102 (e.g., external data source). In other cases, anomaly detection service 102 may receive or obtain customer data that has been processed by a metrics service 110, for example, to distill the raw customer data into one or more metric values across one or more dimensions, for further analysis. In some cases, data from an external data source may first be received by front end 108 or other aspect of the computing resource provider 102, and then routed to the data storage service 124.

As described herein, the anomaly detection service 112 may operate on time series data. As used herein, time-series data or time-partitioned data may be data that has some time information associated with it, such as a time stamp indicating when it was created, ingested by a service, or various other points during the lifecycle of the data. It should be appreciated that the described techniques may also be used on data that does not itself have any time information associated with it. Because the anomaly detection scheduling layer 122 is periodically or repetitively instructing the anomaly election service 112 to obtain and process data, the data that the anomaly election service 112 is analyzing does, in fact, have time information at least implicitly associated with it. As such, the anomaly election service 112, as described herein, can use various models, rule, etc., to detect anomalies both in time series data and non-time series, or data that does not have time information natively associated with it. In some of these cases, various techniques may be employed additionally or alternatively to the techniques described here, to convert non-time series data into time series data. One such example includes the techniques described in U.S. patent application Ser. No. 17/488,771, filed on Sep. 29, 2021, titled "CONVERTING NON TIME SERIES DATA TO TIME SERIES DATA," the contents of which are herein incorporated by reference in their entirety.

In some aspects, the anomaly detection service 112 may generate or access one or more models, such as machine learning models, neural networks, etc., to be used in detecting anomalies within data from a data source 126. In some cases, the anomaly detection service 112 may interact with one or more of metrics service 110 and/or any of a variety of other services, such as may be provided by the computing resource service provider 102, to detect anomalies within various data of interest. In some cases, a data source (not illustrated) may reside in another service, such that the anomaly detection service 112 may receive data from the other service for analysis. In yet some cases, the anomaly detection service 112 may obtain metrics or other metadata of certain customer data, from another service and/or from metrics service 110 to be used in detecting anomalies within the data of interest. In other examples, the anomaly detection service 112 may obtain data from a data source external to the computing resource service provider 102, such as from an external data source.

In various cases, the anomaly detection service 112 may obtain one or more of non-times series data, time series data, and/or metrics data from a data source. The anomaly detection service 112 may identify which type of data it is receiving based on characteristics of the data and/or a source that it is being obtained from, to determine what processing to do to the data to make it suitable for processing by the anomaly detection service 112. In some cases, detection of a field in the data indicating some type of time information, such as creation time, upload time, or time stamp information may be used to determine that the data is time series data. In other cases, the lack of such information may be an input to determining that the data is non-time series data. In some cases it may be desirable to modify the data to have time information associated with it, for use by the anomaly detection service 112. In some cases, such as determining that metric data is at least part of the input data, the anomaly detection service 112 may simply use an indication of the source to determine what type of data it is. In some cases, data source information and/or other information indicating what type of data it is, may be contained in the data itself, may be determined from the data itself, or may be made available from configuration parameters from a given ingestion pipeline or route, which may be configured by a customer.

In some aspects, the anomaly detection service 112 (via appropriately configured and authenticated API calls) may provision and/or access virtual computer systems that are instantiated on physical computing devices hosted and operated by the computing resource service provider 102. The virtual computer systems may be used for various purposes, such as to operate as servers supporting data storage for a customer coupled with compute capabilities to search, query, access, and perform other operations on the customer data, such as to aid in creating models, and detecting anomalies or anomalous behavior within that data.

In some cases, the anomaly detection service 112 may use operational domain knowledge of metrics, provided by metrics service 110, to select and/or configure models and the training/using of the models to detect anomalies. In some examples, the anomaly detection service 112 generates artificial anomalies or indications or real thereof, from time series data provided by a data source, such as data source 126 stored by data storage service 124. The anomaly detection service 112 may include or have access to, a plurality of different machine learning models or other anomaly detection mechanisms, such as statistical models and the like. These models and algorithms may be used to analyze metrics of systems and applications, determine normal baselines, and surface anomalies with minimal user intervention. Enabling anomaly detection for a metric may cause the anomaly detection service 112 to access past metric data through the metrics service 110 to generate a model of the metric's expected values. The model may assess both trends and hourly, daily, and weekly patterns of the metric.

The anomaly detection service 112 may be configured to detect one or more anomalies within a data source, such as data source 126 across one or multiple metrics and/or dimensions. In some aspects, the anomaly detection service 112 may be configured to detect specific types or classes of anomalies, such as across one or multiple specific metrics. In other examples the anomaly detection service 112 may be configured to detect a variety of different types of anomalies across a wide variety of dimensions or metrics. In some cases, anomaly detection service 112 may monitor REST APIs, URLs, and website content, checking for unauthorized changes from phishing, code injection and cross-site scripting, and various other indications of events recorded by one or more applications, services, etc. Anomaly detection service 112 may monitor detect anomalies within a data source 126 with or without modifying the data in the data sources 126.

Based on the metrics (time series data) to evaluate, the anomaly detection service 112 may select one or more models to use in detecting anomalies within data. Types of anomalies and alarms differ between types of metrics, types of applications, etc. Annotating anomalies with types allows for the flexibility to pick the right type of anomalies based on the metric and/or user feedback. User feedback and unique metric requirements are used to adjust what model is used (for example, based on an annotation of a data set, anomaly, etc.), retrain a model, set different thresholds for reporting, etc. For example, user feedback may be used to: adjust importance of an anomaly or insight of the anomaly, adjust what type of anomalies are used to create an insight for a metric, etc. For example, if a user gives feedback that seasonal anomalies are not useful for a certain metric, those anomalies are muted. To get better feedback, the type of anomaly is used to generate explanations which are shown the user. For example, if the anomaly is due to trend changes, the user may be shown the explanation of how the trend changed. Domain knowledge may be used to annotate metrics and select which models are used by the anomaly detection service 112 to create anomalies and rules used for threshold based anomalies. Domain knowledge may also be used to determine when to alarm on an anomaly.

To handle unknown metrics, the anomaly detection service 112 may start in a conservative state such that only high threshold breaches generate alarms and other detectors are selected based on metadata annotator's analysis. For example, if a detector configuration generator classifies time series as continuous and stationary, change-point and missing-value detectors are typically selected. Alarms are adjusted based on user feedback. For example, for the custom metric, the user may provide feedback that threshold breaches at a lower end of the metric are not alarmable and thus new alarms for such an event are not generated.

In some cases, the anomaly detection service 112 may include an anomaly generator (not shown). The anomaly generator may be a process or processes executed by the anomaly detection service 112 to create artificial anomalies (e.g., data points), that can be injected into data, such as time series data, for purposes of training models to detect future anomalies. In some cases, the anomaly generator may access or obtain metrics data from metrics service 110 to aide in generating artificial anomalies or data points. In some aspects, the anomalies generated by the anomaly generator may be used to create and/or train one or models to be used for anomaly detection and classification, such as by the anomaly classifier 116. Details for generating artificial anomalies and using them to train anomaly detection models may be found in U.S. patent application Ser. No. 17/364,212, titled "NEURAL CONTRASTIVE ANOMALY DETECTION," filed on Jun. 30, 2021, the contents of which are herein incorporated by reference in their entirety.

The anomaly detection service 112 may also include an anomaly classifier 116. The anomaly classifier 116 may be a process or processes executed by the anomaly detection service 112 to detect anomalies or anomalous data points (or ranges of data points) within time series data. The anomaly classifier 116 may utilize one or more models, as will be described in greater detail below, to detect and classify certain segments of data, such as time series data.

In some examples, the computing resource service provider 102 may provide data storage through a data storage service 124 to store and manage large volumes of data, including image and other media data, which may collectively be referred to herein as a data source 120. In some cases, the data storage service 124 may interact with anomaly detection scheduling layer 122, anomaly detection service 112 and/or the metrics service 110 to enable detection and/or generation of metrics relevant to data stored by the data storage service 124. Data storage service 124 may be an on-demand data storage service, such as an object-based data storage service, and may be configured to store various forms of media. The data storage service 124 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein.

In some examples, data stored in the data storage service 124, which may collectively form a data source 126 may be organized into data objects, in one or more logical data containers. Data source 126 may be a collection of data having one or more similar attributes. In one example, a data source may be a collection of data spanning a certain time period, which is generated from or by a customer application or service, such as provided by the computing resource service provider 102. The data storage service 124 and/or the data source 126 may include one or more data objects, which may have arbitrary sizes and may, in some instances, have constraints on size. Thus, the data storage service 124 may store numerous data objects of varying sizes. The data storage service 124 may operate as a key value store that associates data objects with identifiers of the data objects which may be used by the client 104 to retrieve or perform other operations in connection with the data objects stored by the data storage service 124. Access to the object-based data storage service 124 may be through application programming interface (API) calls to the service or via an interface, such as a graphical user interface (GUI).

In some aspects, data source 126 may include data obtained from a specific application or service, such as virtual computing resources including virtual machines, containers, etc., data storage services, and other services or entities running within or outside of the computing resource service provider. In some cases the data source 126 may include any of a number of different data sources and different types of data sources, such as from a Software as a Service (SaaS) application, a relational data base or service, a metrics service, or other data source. In some cases, the customer, such as in a request 130, may specify the data source 126, such as via any type of an identifier, including IP address, resource name, such as may be assigned by a computing resource service provider 102 that provides the service or data source, or via other types of identifiers. The data source 126 may include various metrics gathered by metrics service from another data source, logs, and other forms of data.

In some cases, the data storage service 124 may operate as a key value store that associates data objects with identifiers of the data objects which may be used by the client 104 to retrieve or perform other operations in connection with the data objects stored by the data storage service 124. Access to the data storage service 124 may be through application programming interface (API) calls to the service, for example from either directly from client 104, or via the computing resource service provider 102. It should be appreciated that the data storage service 124 may additionally or alternatively provide non-object based data storage, such as block data storage, table-oriented data storage, relational databases, file-based storage, and the like. The data storage service 124 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost effective storage class that may provide access with some delay, different redundancy, or other attributes.

Figure 2:
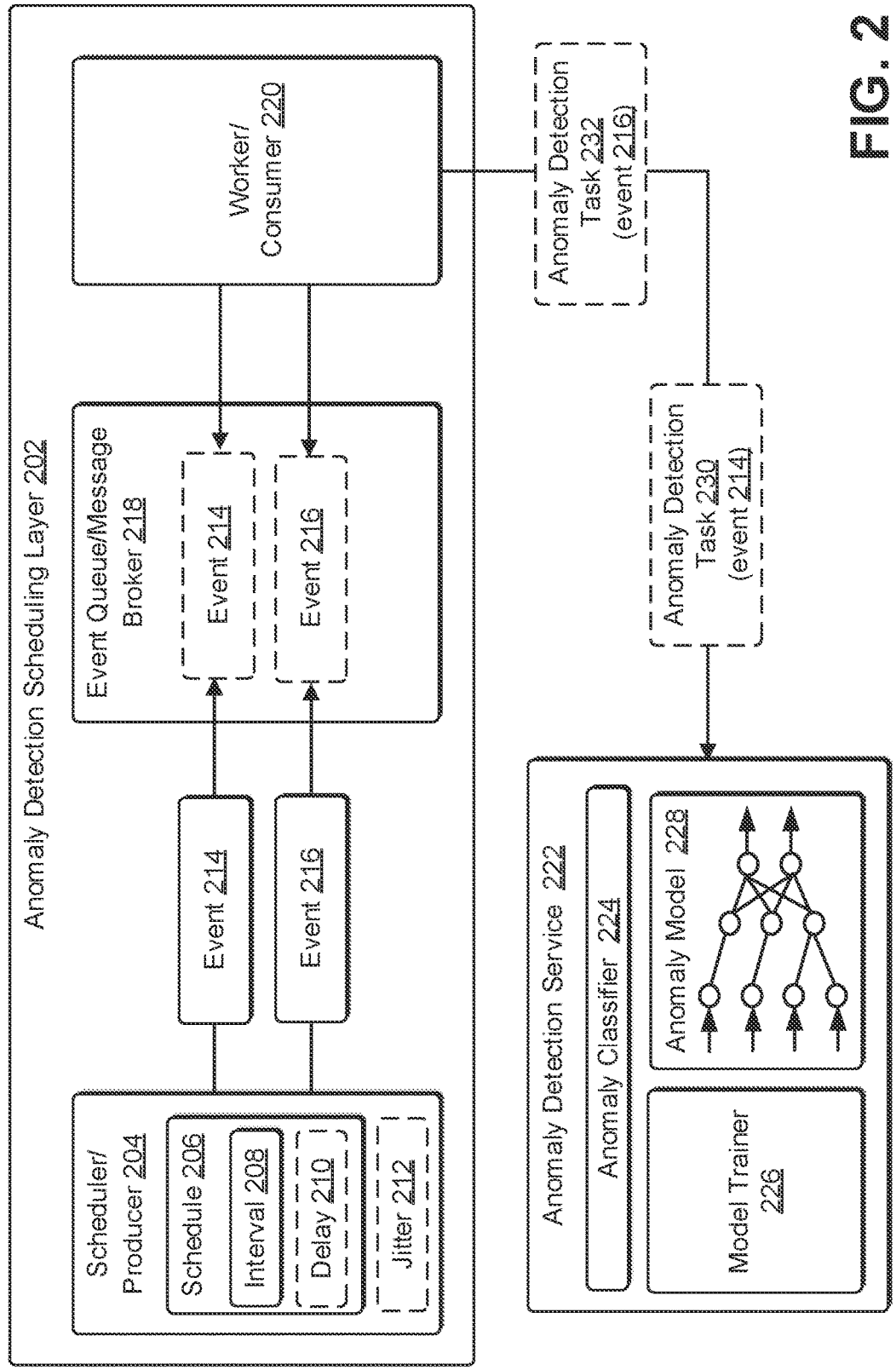
FIG. 2 illustrates an example of an anomaly detection scheduling layer interacting with an anomaly detection service, according to at least one embodiment.

FIG. 2 illustrates a more detailed example of an anomaly detection scheduling layer 202 and an anomaly detection service 222 that may operate in conjunction to process customer data to monitor for and detect anomalies within that data. Anomaly detection scheduling layer 202 and anomaly detection service 222 may include one or more aspects of similarly named components or services as described above in reference to FIG. 1.

As illustrated, the anomaly detection scheduling layer 202 may include a scheduler or producer component 204, an event queue or message broker 218, and a worker/consumer component 220. In some cases, the scheduler component 204 may be a process executed by the anomaly detection scheduling layer 202. In other cases, the scheduler 204 may be a managed service based scheduler, such as provided by a computing resource service provider 102. The scheduler 204 may store a large number of schedules 206, such that it may scale with customer demand. The scheduler 204 supports event-based action so that it can trigger an event when the time is due for the scheduler. Dacia is a tier-1 general purpose scheduling internal service. In some cases, the scheduler 204 may provide a simple application programming interface (API) for managing schedules. In some cases, the API consists of CRUD operations on schedules coupled with probing for next schedule dates, enabling and disabling functionality.

The scheduler 204 may generate a schedule 206 for a given anomaly detection job. The scheduler 204 may utilize the schedule 206 to determine when to generate anomaly detection events 214, 216, that can be temporarily stored by event queue 218 and processed by worker 220 to trigger execution of a corresponding anomaly detection task by an anomaly detection service 222. The may generate a schedule 206 based on a data ingestion interval or time period 208. This interval or time period may span any of a variety of lengths of time, including a little as 1 minute, 5 minutes, 30 minutes, 1, 2, 5 12 hours, or be measured in days. This interval may be determined based on customer selection or configuration, such as through request 130 to a computing resource service provider 102, or may be set by default and/or modified at a later time. As descried herein, the interval of time may also be referred to as a period, time window, or may be referenced by frequency. This interval 208 may determine how data is grouped into sets or batches, to be processed by the anomaly detection service 222. The interval 208 may specify a length of time over which data is collected or aggregated into a single collection of data. This may in turn affect the granularity by which anomalies are monitored for and detected in the customer data.

In one example, if the data ingestion period is set for 5 minutes, each portion or batch of data processed by the anomaly detection model will span 5 minutes windows. This may enable a higher precision in detecting variations and anomalies in various metrics or dimensions of the data, such that dimensions in the data may meaningfully change within 5 minute intervals. In other cases, longer data ingestion intervals may be used, such as 10 minutes, 1 hour, 2 hours, up to 12 hours, 24 hours, a week, a month, etc., based on the types of anomalies desired to be detected. In some cases, the customer may select the data ingestion interval, such as through a user interface provided by a computing resource service provider 102/through one or more requests 130 or interactions with the provider 102. In other cases, a data ingestion interval may be automatically selected by the anomaly detection scheduling layer 202 and/or an anomaly detection service 222 based on characteristic of the data itself, the data source, the type of data source, or set by default. In yet some cases, the ingestion interval may be modified, e.g., automatically, based on historical data/data that is currently being processed, to enable more useful and intuitive anomaly detection.

In some cases, optionally, the scheduler 204 may utilize a delay 210, such as may be set by default or specified by a customer. The delay time period may introduce a delay between when data, such as data is ingested, grouped or partitioned into windows and when it is sent to the anomaly detection service 202 to be analyzed for anomalies. In some cases, when large amounts of data are ingested with a smaller ingestion time interval, the anomaly detection service 222 may not be able to process all the data obtaining during that interval, in the time of one time interval. In these scenarios, a delay may be introduced so that all the data from one data interval may be sent or made available to the anomaly detection service at a single point in time, to facilitate more accurate anomaly detection. It should be appreciated that the delay item period may be set as any of a variety of numbers, but will typically be between a fraction of a ingestion time interval and potentially 1-5 times that interval, such as to ensure that anomaly detection is performed at least close in time (e.g., near-real-time) with the data being obtained. In cases where a delay is implemented, the scheduler 204 may set times for generating anomaly detection events in the schedule 206 based on the data ingestion interval 208 and the delay 210.

For example, a 5 minute interval staring at 12:00 am may result in a schedule such that an event is generated and processed at 12:05, 12:10, 12:15, etc. Introducing a delay, say of 2 minutes may result in a schedule where an event is generated and processed at 12:07, 12:12, 12:17, etc. In some cases, the schedule may determine the initial time when an event is generated by the scheduler 204. In this scenario, the time the event is process may be slightly delayed, and the time that the anomaly detection task is execution may be further delayed, due to time required to process the event and obtain the data for anomaly detection. In other cases, the schedule may be linked to the time the customer data is obtained and/or analysis begins on the data, such that the event would be generated slightly before 12:05 or 12:07, etc., in the above examples.

In yet some cases, optionally, the scheduler 204 may introduce a second delay or jitter delay 212 to in essence add jitter into processing the customer data. In some cases, the delay may be a smaller delay than the ingestion delay 210, and may be set to different values for different schedules that may run in parallel or concurrently. In some aspects, the jitter delay may be on the order of seconds, whereas the ingestion delay may be on the order of minutes. In some case the delay may be implemented in between the scheduler generating an event 214, 216, and storing or transferring the event to the event queue 218. In other cases, the delay configured to account for data jitter may be implemented in addition to the data ingestion delay, such that the event generation times of schedule 206 may change themselves. In some aspects, varying the amount of jitter across different schedules may help minimize huge loads on the system, such that may be caused by network connectivity variations, or bursty customer data/traffic to services that are the origin of the customer data. In some cases, the jitter delay added to different schedules may be varied (e.g., a different number of seconds added to each schedule), such that processing large amounts of data to detect anomies may be avoided at any single point in time. In some cases, different jitter delay values may be added to schedules operating with the same data ingestion interval, in particular, to better distribute processing customer data. In some cases, adding a jitter delay may help to more evenly distribute processing of anomaly detection events system wide.

In some cases, events 214, 216 generated by the scheduler 204 may include time information, such as a timestamp as to when they were generated, identifying information of the data source they pertain to (e.g., a resource identifier), one or more anomaly detectors or anomaly detector models that the customer data is to be processed by (e.g., by a resource identifier), and/or other data as may be used to direct the event to the correct anomaly detector/model. In some cases, the time stamp associated with the event may be used (or a timestamp or time information derived from that time stamp) to associate with a portion of customer data, to in essence generate periodic time series data as an input to the anomaly detection service 222. The scheduler 204 may produce one event per anomaly detection job at a given time, at times specified by a schedule 206, such that events 214, 216 as illustrated, may be generated one at a time, with event 224 being generated before event 216.

Once generated, an event 214, 216 may be sent and temporarily stored in an event queue or message broker 218. The event queue or message broker 218 may include any data store or temporary data storage location to hold event, such as events 214, 216. In some cases, the event broker may be a managed service, such as provided by computing resource service provider 102. In some cases, event queue 218 may automatically scale to accommodate to a burst of messages/events. The event queue 218 may provide one or more dead-letter queues that can be used to handle events that failed to be processed. The order of the events 214, 216 may be maintained in a first in first out (FIFO) scheme. Events may be grouped by one or more characteristics or parameters of the individual events, such as an anomaly detector identifier. In some cases, only one event from a given group or anomaly detection job may be processed at one given time, to ensure time order of the events is maintained and the customer data is ultimately analyzed sequentially. Other events within the same group may be locked as long as there is another event is being processed.

The worker/consumer component 220 may, once an event is detected in the event queue 218, process the event 214, 216 and trigger execution of an anomaly detection task 230, 232 corresponding to event 214, 216, respectively. In some cases, the worker/consumer 220 may be a process executed by the anomaly detection scheduling layer 202. In some cases, consumer 220 may automatically scale (horizontally and vertically) to accommodate consuming a burst of events in the event queue, such that whenever an event is available in the event queue, it may be processed in real time or near real time.

The anomaly detection service 222, upon obtaining the anomaly detection task 214, 216, may access the customer specified data source (e.g., identified in the event), to obtain customer data that corresponds to the prior data ingestion interval. The anomaly detection service 222 may then analyze the obtained customer data by an appropriate model 228 or anomaly detector, and analyze the data to detect anomalies. Details of the anomaly detection process itself will be described in greater detail below. It should be appreciated, that anomaly detection scheduling layer 202 may operate independently of the anomaly detection service 222, such that anomaly detection scheduling layer 202 may not be aware of the status or progress of the analysis performed by the anomaly detection service 222. In this way, independent operation of these two aspects may ensure that the schedule is adhered to and may provide other benefits, such as fault tolerance and so on.

Anomaly detection service 222 may incorporate one or more aspects of anomaly detection service 112 described above in reference to FIG. 1. In the illustrated example, anomaly detection service 222 may include an anomaly classifier 204, a model trainer 208, and one or more anomaly models 210. The anomaly detection service 202 may obtain time series data 228 from data ingestion layer 216, either directly or indirectly, such as through one or more data stores.

Anomaly classifier 204 may utilize various data, and/or models 210 to characterize portions of data within data source as anomalous. The anomaly classifier 204 may ingest data, such as from any of data sources 214, and determine whether anomalies exit within that data. This may include obtaining data and segmenting the data into segments or windows, such as corresponding to different time periods within time series data. As used herein, time series data may refer to any collection of data that includes a series of data points in time order. Examples described herein refer primarily to time series data. Ain some cases, data may be segmented into windows, and further segmented into context and suspect windows, whereby the data in a window may be compared to data in another window to determine if an anomaly exists in one of the windows. The anomaly classifier 204 may utilize one or more anomaly models 210 to determine if certain data within a data source has one or more characteristics of an anomaly. The anomaly classifier 204 may obtain data, segment it into one or more windows, and compare the data within at least one window, or a representation thereof, to the model 210 to determine if that data is consistent with an anomaly. The anomaly classifier 204 may output a score, which may then be compared to one or more thresholds, to determine if the data of interest contains an anomaly.

In some cases, anomalies may be defined or characterized in a number of different ways, such as value or range based (e.g., if latency is above this threshold, or data throughput is outside of a given range), relative difference (e.g., more than 20% difference from values within a certain time period), and so on. In some cases, anomalies may be initially defined in such a way, where a model may be trained to detect such anomalies. This may be accomplished by setting thresholds that can be used to classify data as within the normal bounds of expected data or outside of these bounds, or anomalous.

In some cases, the anomaly classifier 204 may determine which metrics are of interest for anomaly detection. In some examples, the metric or metrics for which anomalies are to be detected may be specified in a request to configure the anomaly detection service 202, such as in request 130 described above in reference to FIG. 1. In this example, only relevant portions of the data may be analyzed to detect anomalies, where the portions analyzed are selected based on what metrics are of interest. In other examples, data may be analyzed for a variety of different anomalies spanning multiple and in some cases, unspecified metrics.

In some cases, the anomaly classifier 204 scans for metrics (e.g., from a metrics service 110) to determine which metrics to add or delete for anomaly detection. In some embodiments, metrics are added/deleted by specific user request. In some embodiments, the anomaly classifier 204 formats the time series data 228 prior to analyzing it and/or presenting it to model trainer 208 to be input into one or more models 210.

Model trainer 208 may receive as inputs time series data 228 from the data ingestion layer, data directly from one of data sources 230, 232, 234, 236, and/or from other sources of time series data that may share one or more characteristics with time series data 228. In some cases, the model trainer may receive supervised or annoyed data that specifics which data points are anomalous. The model trainer 208 may then create and modify one or more models 210 using the unsupervised data and supervised data or labeled anomalies. In some cases, the model trainer 208 may use a contrastive loss function to map similar data to be similarly represented in at least one dimension within the model 210. This may take the form of a distance metric, such that similar data points may be mapped as having a small distance between them, whereas a normal data point and an anomalous data point may have a greater distance between them. In other cases, a variety of other functions may be used to map or represent various data points within model 210, such that the model 210 can then be used to differentiate between normal or expected data points and anomalous data points.

Anomaly model(s) 210 may include any of a variety of different types of models, including various machine learning or deep learning models, neural networks, etc. In some examples, model 210 may include one or more convolution neural networks, and/or may utilize structural equation modelling. Model(s) 210 may be trained by model trainer 208 in various ways.

In some aspects, the model trainer 208 takes in metric metadata (domain knowledge such as known latency metrics, etc.), the time series data (metrics), system update information, (global usage knowledge such as an analysis of data usage in the provider network), and/or other forms or sources of data to configure one or more models 210 for anomaly detection. In some cases, the model trainer 208 uses this and/or other information to determine which of multiple models 210 to use for a specific request/type of data to be used to detect potential anomalies within the time series data.

In some embodiments, the model trainer 208 analyzes metrics and determines attributes (annotations) to the data for use by the anomaly classifier 204/model(s) 210. Examples of annotations include, but are not limited to: a metric resource type (stream, database, etc.); a metric type such as throttle, request rate, latency, error rate, custom, etc.; metric features such as seasonality period(s), stationary, etc.; metric limit thresholds; and metric domain knowledge. The model trainer 208 uses this information to configure one or more of models 210. The configuration may include one or more of: the metric to evaluate, how to configure the model, domain knowledge metadata of interest (e.g., thresholds, aggregation information), and the time series data. The model trainer 208 may also receive user feedback to adjust model sensitivity, what items are not of interest (which can then be used to retrain a model to ignore an observation), etc.

The anomaly classifier 204 takes in time series data (and in some instances metric metadata) as input and generates, as configured, anomaly indications as events (event start/end) and type as output. In some embodiments, the anomaly indications include a score. In some cases, the score may be a numeric score (e.g., from 1-10, 1-100, etc.). In some cases, multiple indications are collected and then compared to one or more thresholds before determining if an anomalous has been detected.

Figure 3:
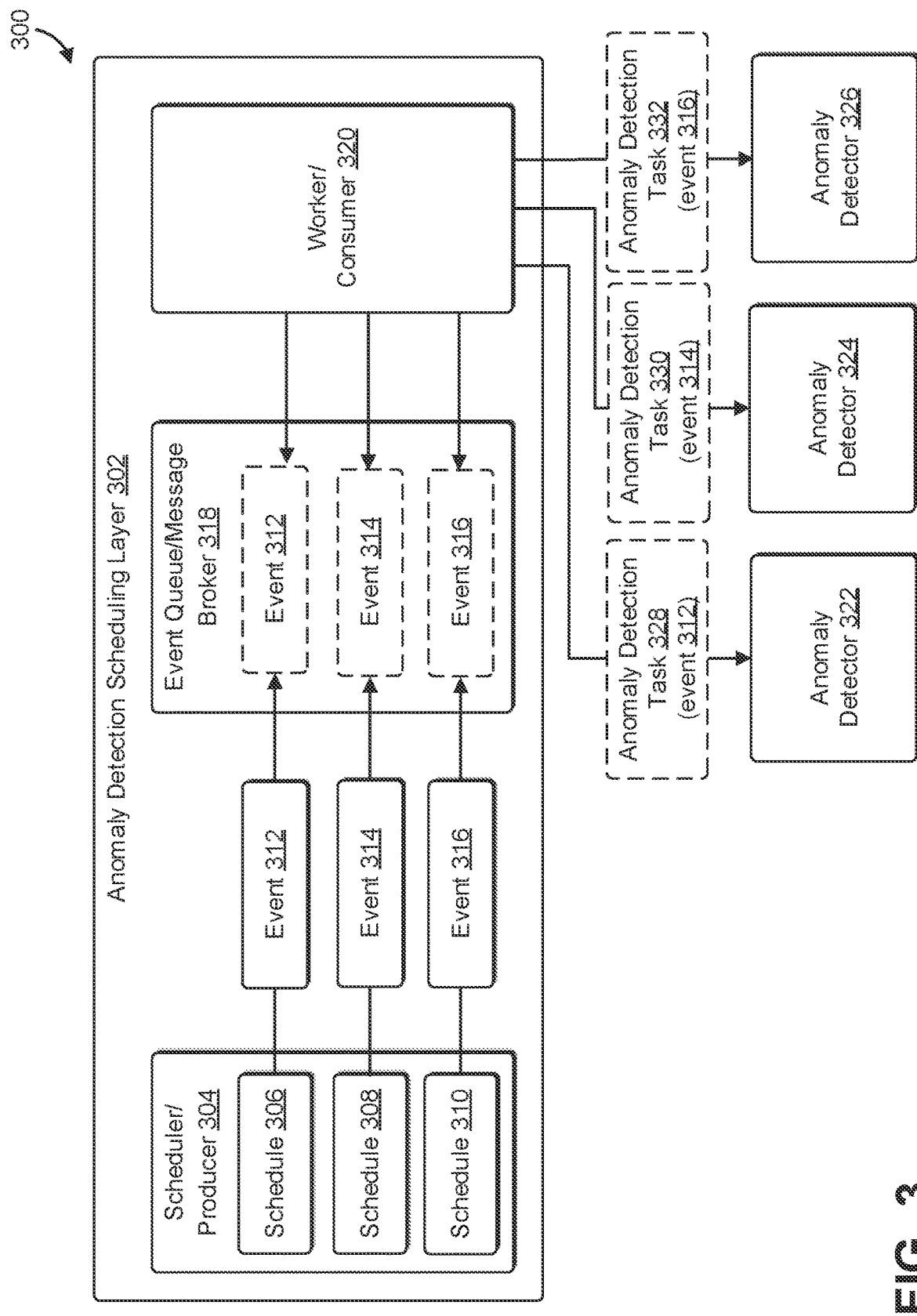
FIG. 3 illustrates another example of an anomaly detection scheduling layer interacting with an anomaly detection service, according to at least one embodiment.

FIG. 3 illustrates an example 300 of interactions between an anomaly detection scheduling layer 302 and multiple anomaly detectors 322, 324, 326, such as may be provided by an anomaly detection service, to schedule generate and trigger execution of anomaly detection tasks. Anomaly detection scheduling layer 302 may include one or more aspects of the anomaly detection scheduling layer 122, 202 as described above in reference to FIGS. 1 and 2. In addition, schedule/producer 304, event queue/message broker 318, and/or worker/consumer 320 may include one or more aspects of similarly named components described above in reference to FIG. 2, and for the sake of brevity, will not be repeated again here.

As illustrated, scheduler 304 may generate and manage a number of different schedules 306, 308, 310 corresponding to different anomaly detection jobs. The scheduler 304, according to schedules 306, 308, 310, may generate a number of events 312, 314, 316 concurrently and place them in event queue 318. The worker/consumer 320 may obtain the events 312, 314, 316 and in response generate a corresponding anomaly detection task 328, 330, 332 for each event 312, 314, 316, and direct the anomaly detection task 328, 330, 332 to the appropriate anomaly detector 322, 324, 326, respectively. In this way, by processing event concurrently, the anomaly detection scheduling layer 302 may scale to facilitate concurrently processing a large number of anomaly detection jobs.

In some cases, a single event queue 318 may be implemented for multiple schedules/events having the same data ingestion interval. In this scenario different jitter delays may be added to the different schedules to ensure that processing events from the queue 318 does not all happen at the same time, but is rather distributed throughout the data ingestion interval. In some cases, the length of the delay and/or the length of the jitter delay may be selected to spread out processing of events in a data ingestion interval, and may be applied to subsequent data ingestion intervals/events for a given schedule. In some cases, the amount of jitter delay may be determined by dividing the length of the data ingestion interval by the number of different schedules that are formed around that data ingestion interval. In other cases, different techniques may be used to determine the jitter delay, such as random selection and so on. In some examples, multiple different event queues 318 may be implemented with each event queue 318 corresponding to a given data ingestion interval. The delay value and/or the jitter delay may then be determined for each queue, such as to distribute processing of events in the given queue.

Figure 4:
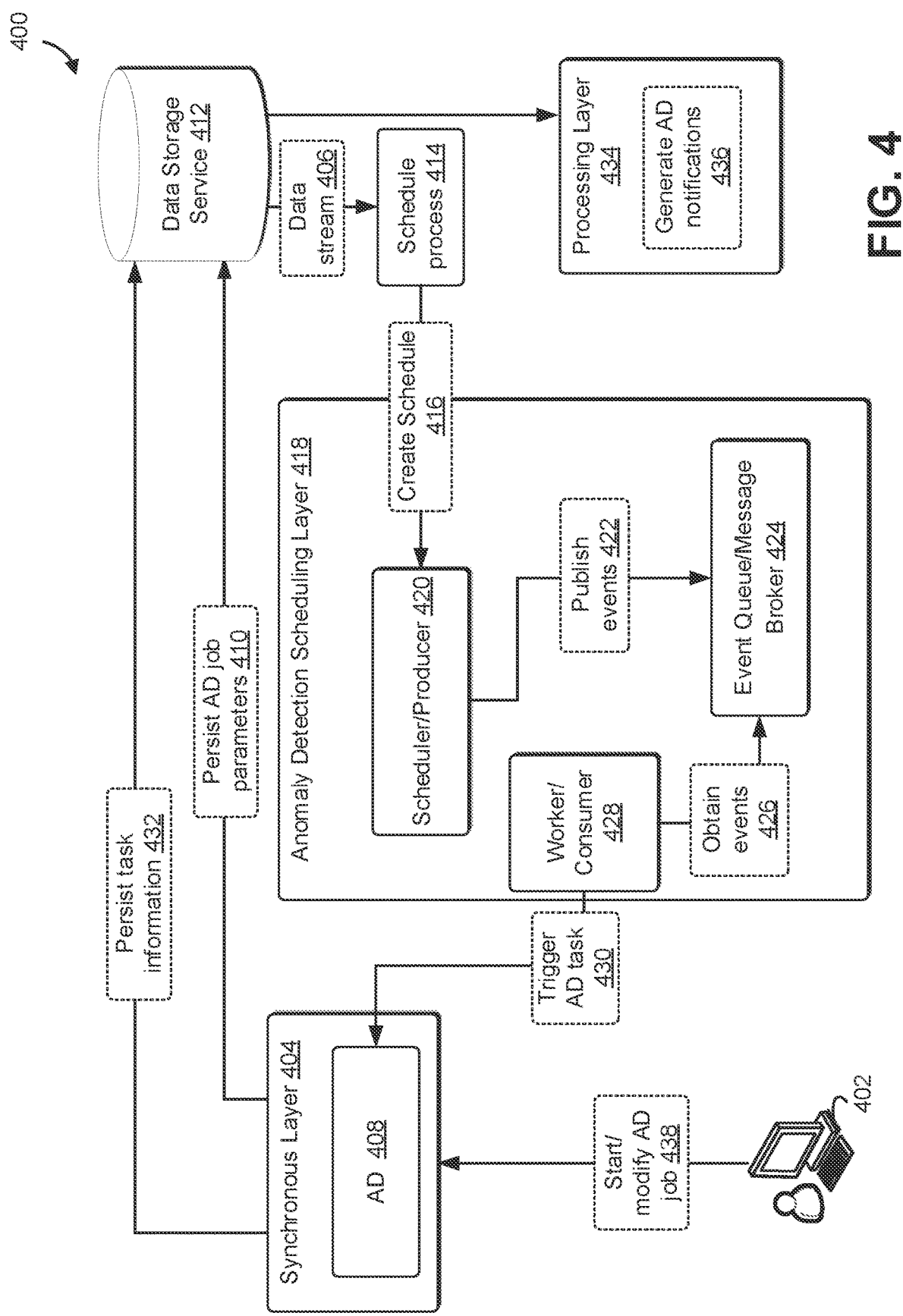
FIG. 4 illustrates an example system and process for scheduling and triggering anomaly detection events, according to at least one embodiment.

FIG. 4 illustrates an example system and process 400 for scheduling and triggering anomaly detection events. In some aspects, anomaly detection scheduling layer 418, and/or data storage service 412, may include one or more aspects of the anomaly detection scheduling layer 122, 202, 302 and data storage service 124 as described above in reference to FIGS. 1, 2, and 3. In addition, schedule/producer 420, event queue/message broker 424, and/or worker/consumer 428 may include one or more aspects of similarly named components described above in reference to FIGS. 2 and 3, and for the sake of brevity, will not be repeated again here.

As illustrated, a client device 402 may interact with a synchronous layer 404, such as over one or more networks. The synchronous layer 404 may be a collection of computing resources, such as provided by a computing resource service provider 102, that operate to facilitate, among other things, anomaly detection jobs through an anomaly detection scheduling layer 414 and one or more anomaly detectors (Ads) 408, such as may be provided by an anomaly detection service, as described above. As illustrated, client device 402 may send a request to start or modify an anomaly detection job at operation 438. In some cases, the request may be in the form of an API call, such as a CreateAnomalyDetector API call, and may include parameters for configuring anomaly detection for a data source, as described in more detail above. The synchronous layer 404, may obtain the request, and perform normal validations and persist a record of the anomaly detection job at operation 410 in the database, such as managed by a data storage service 412. As a result, a database stream record may be generated, such as eventually. Asynchronously, a database stream record 406 will be consumed by schedule process or unction 414, which, in return, calls the scheduler 420 to create a schedule, at operation 416, for the requested anomaly detection job. In some cases the create schedule request specifies enabled-on-create Boolean flag so that the scheduler 420 enables it immediately.

In cases where the scheduler 420 might not be created due to downstream issue, an operational tool can be provided for operators to create the scheduler 420 manually in a result of an operational ticket. To address cases where the scheduler 420 is created after a long delay due to throttling of the schedule process 414 or similar issues, the schedule process 414 itself may be configured to have some reserve capacity so as to avoid this situation.

Upon receiving the create schedule request, at operation 416, the scheduler 420 generate a schedule, as described above, and may generate an event for the anomaly detection job according to the schedule and publish the event, at operation 422, to the event queue 424. The event queue 424 receives the event and make it available according to the FIFO ordering, as well as, it groups the events per group/anomaly detection job. The worker process 428 may obtain the event at operation 426 and trigger an anomaly detection task, at operation 430. The anomaly detection task generated at operation 430 may be obtained by an anomaly detection process 408, such as may be managed by the synchronous layer 404. Anomaly detection process 408 may in turn call a StartAnomalyDetectionTask API, which may begin execution of the anomaly detection task by an anomaly detection service, as described in more detail above.

In some cases, the synchronous layer 404 may then persist the task information, at operation 432, in the data storage service 412, which may in turn trigger the processing layer 434 to generate one or more anomaly detection notifications, at operation 436. In some cases, the processing layer may be a process executed by a computing resource service provider 102. In some examples, the notifications relating to the results of anomaly detection may be stored back into the data storage service 412, which may trigger notifications to a client device 402 and/or may make information of the notifications available to the client device 402.

Figure 5:
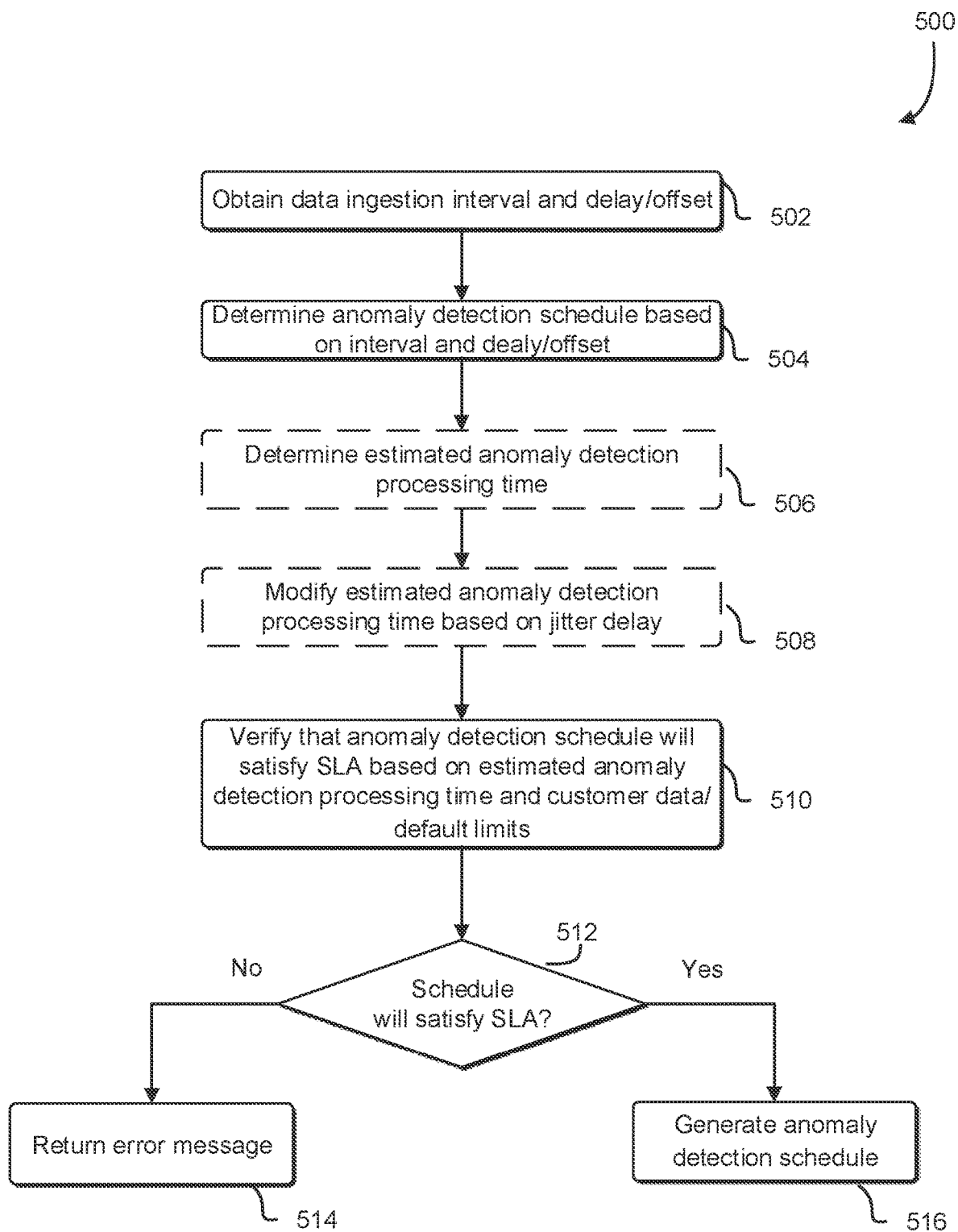
FIG. 5 illustrates an example process for generating an anomaly detection schedule, according to at least one embodiment.

FIG. 5 illustrates an example process 500 for generating an anomaly detection schedule. In some cases, process 500 may be performed by one or more of anomaly detection scheduling layer, such as anomaly detection scheduling layer 122, 202, 302, 418, a synchronous layer 404, and/or processing layer 434, as described above in reference to FIGS. 1-4.

Process 500 may begin at operation 502, in which a data ingestion interval value and a delay or offset value may be obtained, such as through a request to configure an anomaly detector for customer data. Next, an anomaly detection schedule may be determined based on the interval and the delay or offset, as described in greater detail above, at operation 504. In some cases, the estimated anomaly detection processing time for individual windows of data (e.g., data that spans a data ingestion interval) may be determined, at operation 506. In some cases, operation 508 may include using historical data of similar anomaly detection tasks, amount, type, or other characteristic of the customer data to be analyze to estimate the processing time for a span of customer data split up into different intervals, and may include taking into account the delay or offset value. In yet some cases, the estimated anomaly detection processing time may be further modified based on jitter delay, such as may be implemented to spread out data more evenly throughout a given time period to ensure that the anomaly detection is not overwhelmed or slowed down by high concentrations of customer data in specific data ingestion intervals, at operation 508.

This estimated processing time may then be used, at operation 510, to verify that the schedule, determined at operation 504, will satisfy one or more service level agreements or default time limit for individual anomaly detection tasks. In some cases, a default SLA or time limit for processing a given portion of data in a data ingestion window may be set at a multiple of the data ingestion interval, such as 2 times, three times, or 5 times the data ingestion interval, for example. In yet some cases, the SLA may be specified by a client. In either case, at operation 512, it may be determined if the schedule will satisfy the SLA or time limit. If not, an error message may be returned, at operation 514, which may prompt reconfiguring of the event based schedule. If the schedule does meet the SLA or time limit, then the anomaly detection schedule may be generated and stored for use, at operation 516, such as by an anomaly detection scheduling layer or scheduler, as described above.

Figure 6:
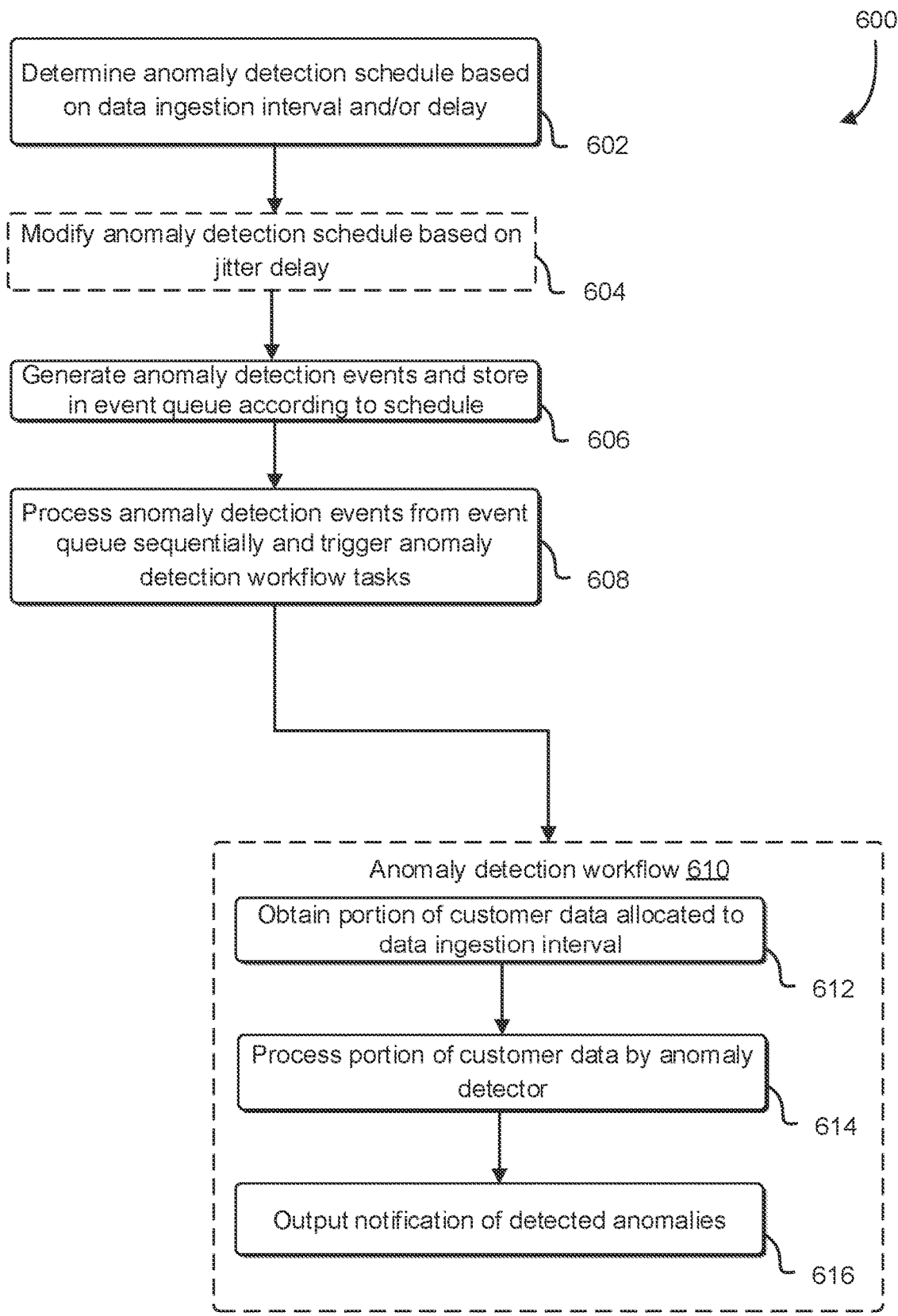
FIG. 6 illustrates an example process for determining an anomaly detection schedule and triggering anomaly detection tasks, according to at least one embodiment.

FIG. 6 illustrates an example process 600 for determining an anomaly detection schedule and triggering anomaly detection tasks. In some cases, process 600 may be performed by one or more of anomaly detection scheduling layer, such as anomaly detection scheduling layer 122, 202, 302, 418, an anomaly detection service, such as detection service 112, 222, one or more anomaly detectors, such as anomaly detectors 322, 324, 326, a synchronous layer 404, and/or processing layer 434, as described above in reference to FIGS. 1-4.

Process 600 may begin at operation 602, in which an anomaly detection schedule may be determined based on a data ingestion interval and/or a specified delay value, as described in greater detail above. In some optional aspects, the anomaly detection schedule may be modified to account for jitter in the customer data, such as by introducing a jitter delay between an event trigging executions of an anomaly detection task, and obtaining the customer data for detecting anomalies within the data, at operation 604. In some cases, operation 604 may include dynamically selecting a second time period to introduce jitter in processing the plurality of anomaly detection events, such that the second time period is implemented (in some cases, in addition to the delay time period) between a start of individual data ingestion intervals and a time at which individual portions of the time series data are processed to detect anomalies, to distribute processing the plurality of anomaly detection events across the data ingestion interval.

Next, individual anomaly detection events may be generated and stored in an event queue, at operation 606, as described in greater detail above. Operation 606 may include generating an anomaly detection event for each data ingestion interval, sequentially, one at a time, and storing them one at a time in an event queue. Next, at operation 608, each anomaly detection event may be processed, such as by a worker or consumer, sequentially to trigger anomaly detection workflow tasks, as described in neater detail above. In some cases, state of each event may be tracked, such as by the anomaly detection scheduling layer, to ensure that events are generated and processed in order and only processed a single time. In some aspects, different event queues may be implemented for different schedules, such that events correspond to schedules that have the same data ingestion interval may be grouped into the same queue, and events correspond to schedules that have different same data ingestion interval may be grouped into different queues.

In some aspects, process 600 may also optionally include the actual process 610 for obtaining the customer data, according to the anomaly detection workflow task. Each task may be processed by sub-process 610, which may include operations 612-616. As illustrated, operation 612 may include obtaining a portion of customer data that is allocated to the current or previous data ingestion interval. In some cases, this may include obtaining data that was received or ingested or is associated with the prior data ingestion interval. Next, at operation 614, the portion of customer data may be processed or run through an anomaly detection model to determine if any anomalies are detected within the portion of data. The output of the anomaly detection process may then be generated, and may take the form of one or more notifications of detected anomalies, at operation 616.

In some cases, the anomaly detection schedule may be updated or modified, such as at any time during the life of the anomaly detection schedule. The updates may be performed automatically, and may be triggered via a number of different events. In some cases, a customer may change one or more parameters of an anomaly detection job, such as the data ingestion interval, the delay, or other values. In response to these changes, the schedule may be updated. In yet some cases, when schedules are added or removed from the scheduling layer, the jitter delay may be adjusted to better distribute processing of events to detect anomalies across a given queue or system wide. In yet other examples the schedule may be modified based on a number of other factors or events.

Figure 7:
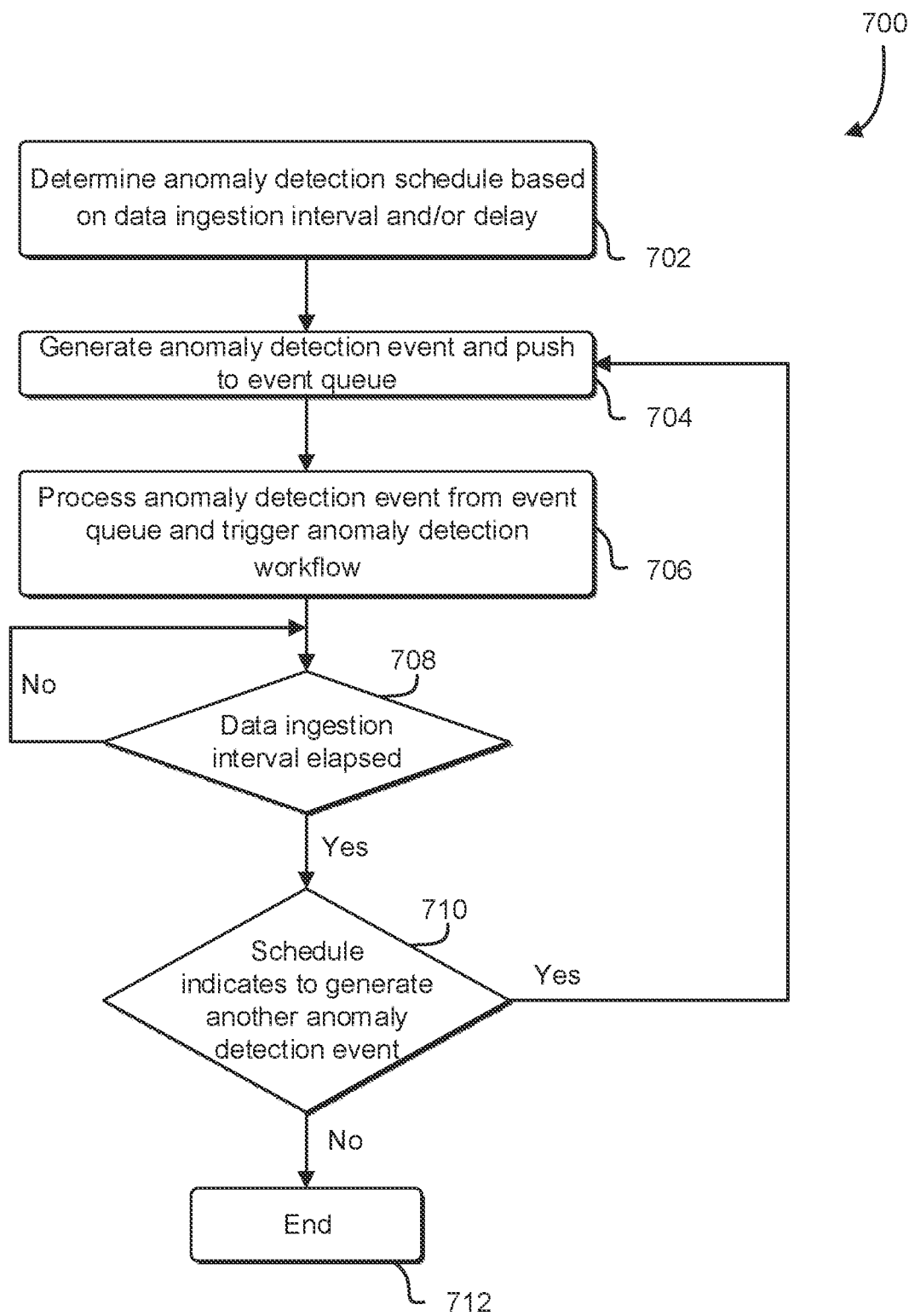
FIG. 7 illustrates another example process for determining an anomaly detection schedule and triggering anomaly detection tasks, according to at least one embodiment.

FIG. 7 illustrates another example process 700 for determining an anomaly detection schedule and triggering anomaly detection tasks. In some cases, process 700 may be performed by one or more of anomaly detection scheduling layer, such as anomaly detection scheduling layer 122, 202, 302, 418, an anomaly detection service, such as anomaly detection service 112, 222, one or more anomaly detectors, such as anomaly detectors 322, 324, 326, a synchronous layer 404, and/or processing layer 434, as described above in reference to FIGS. 1-4.

Process 700 may begin at operation 702, in which an anomaly detection schedule may be determined based on a data ingestion interval and/or a specified delay value, as described in greater detail above. Next, individual anomaly detection events may be generated and stored in an event queue, at operation 704, as described in greater detail above. Operation 704 may include generating an anomaly detection event for each data ingestion interval, sequentially, one at a time, and storing them one at a time in an event queue. Next, at operation 706, each anomaly detection event may be processed, such as by a worker or consumer, sequentially to trigger anomaly detection workflow tasks, as described in neater detail above.

Next, it may be determined if a data ingestion interval has elapsed, at operation 708. If not, process 700 may continue to loop back through operation 708, until a data ingestion interval is determined to have elapsed. At that point, process 700 may proceed to operation 710, in which it may be determined if the schedule indicates to generate another anomaly detection event. If yes, process 700 may loop back through operations 704, 706, 708, and 710, until the schedule indicates that no more events should be generated, at which point process 700 may end at 712.

Figure 8:
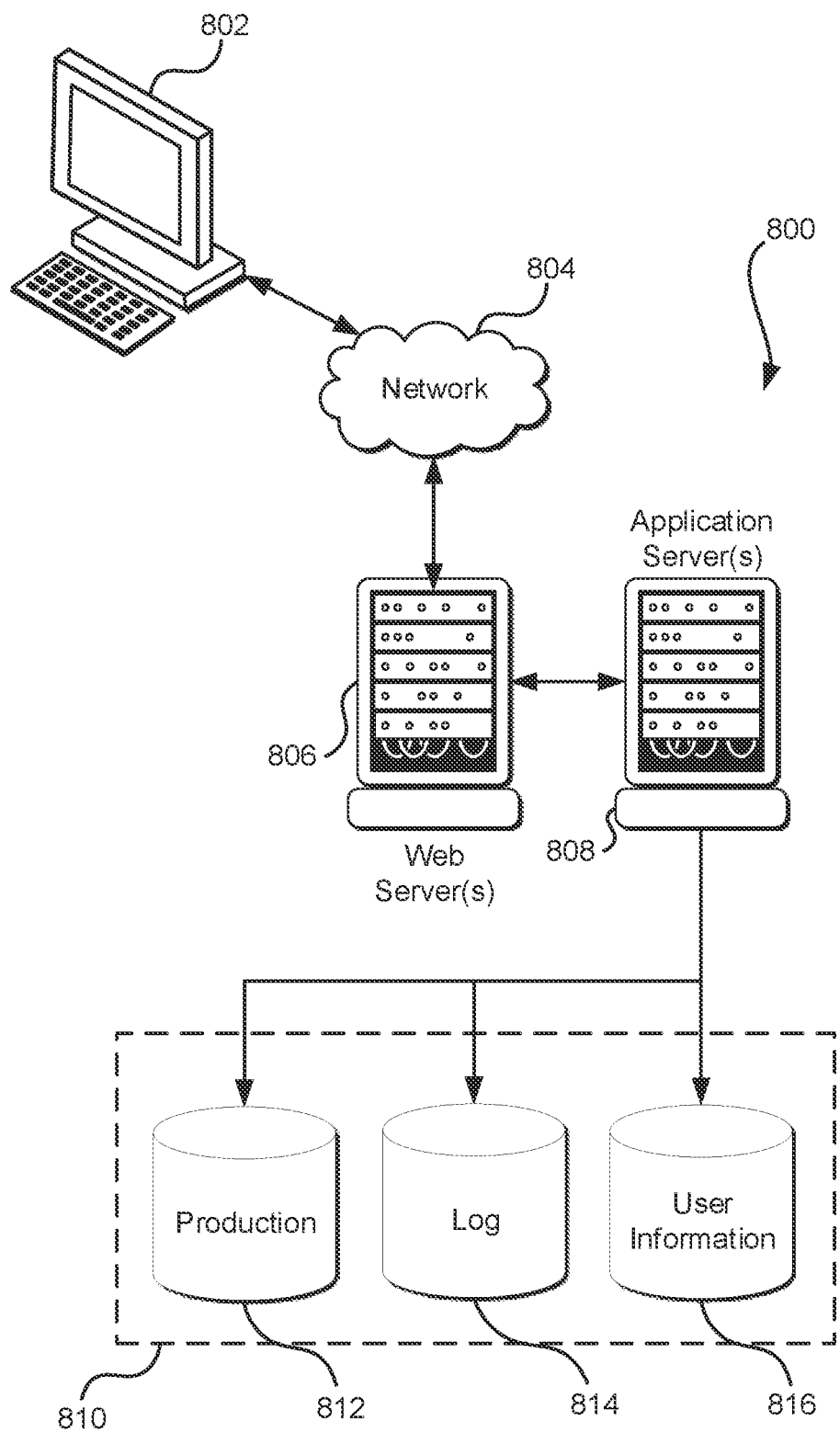
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

In some examples, the application server(s) 808 may host a data anomaly detection scheduling layer 122, 202, 302, 402, and/or an anomaly detection service, such as service 112, 222, as described above. The anomaly detection service 112, 222 may obtain data from data source which may be store or obtained from data store 710. In other cases, data source may originate or be obtained other services, such as hosted by application server(s) 708.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method comprising:
   determining, based on a data ingestion interval and a delay, an anomaly detection schedule for monitoring time series data to detect anomalies, the data ingestion interval specifying a length of time corresponding to an aggregation period of the time series data that is aggregated into a plurality of portions of time series data, the delay specifying a time period from the start of individual data ingestion intervals until individual portions of the time series data are processed to detect anomalies;
   repetitively generating and placing sequentially in an event queue, an anomaly detection event for each portion of the time series data at times specified by the anomaly detection schedule; and
   processing the plurality of anomaly detection events sequentially from the event queue to trigger execution of a plurality of anomaly detection workflow tasks at the times specified by the anomaly detection schedule, wherein execution of individual anomaly detection workflow tasks of the plurality of anomaly detection workflow tasks causes individual portions of time series data of the plurality of portions of time series data to be obtained from a customer data source and processed by an anomaly detection service to detect anomalies in the time series data.

2. The computer-implemented method of claim 1, further comprising:
   dynamically selecting a second time period to introduce jitter in processing the plurality of anomaly detection events;
   and
   waiting the second time period in addition to the time period between a start of individual data ingestion intervals and a time at which individual portions of the time series data are processed to detect anomalies, to distribute processing the plurality of anomaly detection events across the data ingestion interval.

3. The computer-implemented method of claim 1, further comprising:
determining the anomaly detection schedule based at least in part on a service level agreement associated with detecting anomalies in the time series data.

4. The computer-implemented method of claim 1, further comprising:
executing, by the anomaly detection service, the plurality of anomaly detection workflow tasks according to the anomaly detection schedule.

5. The computer-implemented method of claim 1, further comprising:
updating the anomaly detection schedule based on an updated data ingestion interval value or an updated delay value.

6. A system, comprising:
at least one processor;
memory that stores computer-executable instructions that, as a result of being executed by the one or more processors, cause the system to:
determine, based at least in part on a data ingestion interval, an anomaly detection schedule for monitoring time series data to detect anomalies, the data ingestion interval specifying a length of time for an aggregation period of time series data that is aggregated into a plurality of portions of time series data;
generate and store, in an event queue, a plurality of anomaly detection events sequentially at times specified by the anomaly detection schedule; and
process the plurality of anomaly detection events sequentially from the event queue to trigger execution of a plurality of anomaly detection workflow tasks at the times specified by the anomaly detection schedule, execution of individual anomaly detection workflow tasks of the plurality of anomaly detection workflow tasks causing individual portions of time series data of the plurality of portions of time series data to be obtained from a customer data source and processed by an anomaly detection model to detect anomalies in the time series data.

7. The system of claim 6, wherein the computer-executable instructions further include instructions that further cause the system to:
wait a first time period between the start of individual data ingestion intervals and a time at which individual portions of the time series data are processed to detect anomalies, the first time period selected to introduce jitter in processing the plurality of anomaly detection events.

8. The system of claim 6, wherein the computer-executable instructions further include instructions that further cause the system to:
generate and store individual anomaly detection events of the plurality of anomaly detection events corresponding to individual data ingestion intervals sequentially.

9. The system of claim 6, wherein the computer-executable instructions further include instructions that further cause the system to:
determine the anomaly detection schedule further based at least in part on a delay, wherein the delay comprises a time period from the start of individual data ingestion intervals until individual portions of the time series data are processed to detect anomalies.

10. The system of claim 9, wherein the computer-executable instructions further include instructions that further cause the system to:
wait a second time period in addition to the time period between the start of individual data ingestion intervals and a time at which individual portions of the time series data are processed to detect anomalies, the second time period selected to distribute processing the plurality of anomaly detection events across the data ingestion interval.

11. The system of claim 9, wherein the computer-executable instructions further include instructions that further cause the system to:
determine a length of the time period of the delay based on a service level agreement associated with detecting anomalies in the time series data.

12. The system of claim 6, wherein the computer-executable instructions further include instructions that further cause the system to:
generate a first anomaly detection event of the plurality of anomaly detection events at a first time and store the first anomaly detection event in the event queue;
process the first anomaly detection event from the event queue to trigger execution of a first anomaly detection workflow task of the plurality of anomaly detection workflow tasks;
generate a second anomaly detection event of the plurality of anomaly detection events at a second time one data ingestion interval after the first time according to the anomaly detection schedule and store the second anomaly detection event in the event queue; and
process, upon or after triggering execution of the first anomaly detection workflow task, the second anomaly detection event from the event queue to trigger execution of a second anomaly detection workflow task of the plurality of anomaly detection workflow tasks.

13. The system of claim 6, wherein the computer-executable instructions further include instructions that further cause the system to:
determine a second anomaly detection schedule for monitoring second time series data to detect anomalies based on a second data ingestion interval, wherein the second data ingestion interval comprises the length of time;
generate and store, in the event queue, a second plurality of anomaly detection events sequentially at times specified by the second anomaly detection schedule; and
process, concurrently with the plurality of anomaly detection events, the second plurality of anomaly detection events sequentially from the event queue to trigger execution of a second plurality of anomaly detection workflow tasks at the times specified by the second anomaly detection schedule.

14. The system of claim 6, wherein the computer-executable instructions further include instructions that further cause the system to:
determine a second anomaly detection schedule for monitoring second time series data to detect anomalies based on a second data ingestion interval, wherein the second data ingestion interval comprises a second length of time different from the length of time;
generate and store, in a second event queue, a second plurality of anomaly detection events sequentially at times specified by the second anomaly detection schedule; and
process the second plurality of anomaly detection events sequentially from the second event queue to trigger execution of a second plurality of anomaly detection workflow tasks at the times specified by the second anomaly detection schedule.

15. The system of claim 6, wherein the computer-executable instructions further include instructions that further cause the system to:
   determine the anomaly detection schedule for monitoring the time series data to detect anomalies further based on an estimated anomaly detection processing time for individual portions of data of the plurality of portions of data.

16. A non-transitory computer-readable storage medium storing thereon executable instructions that, as a result of being executed by one or more processors of a computer system, cause the computer system to at least:
   determine, based at least in part on a data ingestion interval, an anomaly detection schedule for monitoring time series data to detect anomalies, the data ingestion interval specifying an aggregation period for which the time series data is collected into a plurality of portions of time series data;
   repetitively generate individual anomaly detection events of a plurality of anomaly detection events sequentially at times specified by the anomaly detection schedule; and
   process the plurality of anomaly detection events sequentially to trigger execution of a plurality of anomaly detection workflow tasks at the times specified by the anomaly detection schedule, execution of individual anomaly detection workflow tasks of the plurality of anomaly detection workflow tasks causing individual portions of time series data of the plurality of portions of time series data to be processed by an anomaly detection model to detect anomalies in the time series data.

17. The non-transitory computer-readable storage medium of claim 16, wherein the instructions further comprise instructions that, as a result of being executed by the one or more processors, cause the computer system to:
   modify the anomaly detection schedule to account for large concentrations of data within the data ingestion interval.

18. The non-transitory computer-readable storage medium of claim 16, wherein the instructions further comprise instructions that, as a result of being executed by the one or more processors, cause the computer system to:
   wait a first time period between the start of individual data ingestion intervals and a time at which individual portions of the time series data are processed to detect anomalies.

19. The non-transitory computer-readable storage medium of claim 16, wherein the instructions further comprise instructions that, as a result of being executed by the one or more processors, cause the computer system to:
   determine a second anomaly detection schedule for monitoring second time series data to detect anomalies;
   repetitively generate a second plurality of anomaly detection events sequentially at times specified by the second anomaly detection schedule; and
   process the second plurality of anomaly detection events sequentially to trigger execution of a second plurality of anomaly detection workflow tasks at the times specified by the second anomaly detection schedule.

20. The non-transitory computer-readable storage medium of claim 16, wherein the individual anomaly detection events comprise an identifier of the source of the time series data and an identifier anomaly detection model.

21. The non-transitory computer-readable storage medium of claim 16, wherein the instructions further comprise instructions that, as a result of being executed by the one or more processors, cause the computer system to:
   determine the anomaly detection schedule based at least in part on a service level agreement associated with detecting anomalies in the time series data.

22. The non-transitory computer-readable storage medium of claim 16, wherein the instructions further comprise instructions that, as a result of being executed by the one or more processors, cause the computer system to:
   determine the anomaly detection schedule for monitoring the time series data to detect anomalies further based on an estimated or observed amount of time series data contained in the individual portions of time series data of the plurality of portions of time series data.

* * * * *